Aug. 5, 1930.   MARIUS JEAN-BAPTISTE BARBAROU   1,772,237
AIR HEATER FOR CARBURETORS
Filed June 4, 1929
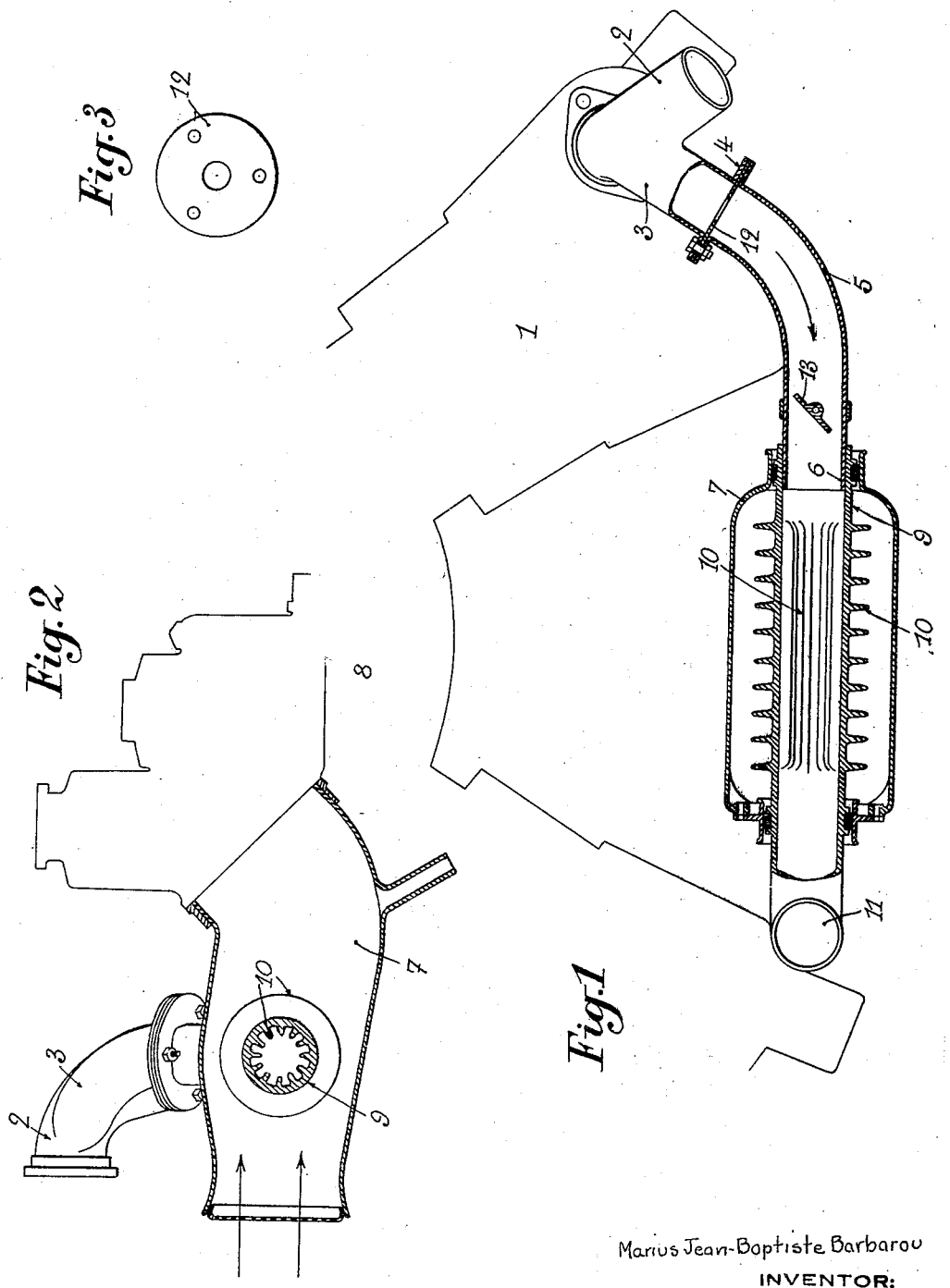
Marius Jean-Baptiste Barbarou
INVENTOR;
By Otto Munk
his Attorney.

Patented Aug. 5, 1930

1,772,237

UNITED STATES PATENT OFFICE

MARIUS JEAN-BAPTISTE BARBAROU, OF PARIS, FRANCE

AIR HEATER FOR CARBURETORS

Application filed June 4, 1929, Serial No. 368,401, and in France July 6, 1928.

The present invention relates to a heating device for carburetors by means of which the air is heated before it is supplied to the carburetor. The device according to the invention may be substituted for all known heating devices using water or oil, which are often insufficient, or cannot be used, particularly in aircraft engines of the air-cooled type.

According to a feature of the invention, the heating device comprises a pipe which is connected to the exhaust collector of one or more cylinders of the engine and extends through the air intake conduit of the carburetor.

According to another feature of the invention, the part of the pipe situated within said carburetor intake chamber is provided with internal and external radiating ribs.

In the accompanying drawing which is given solely by way of example:

Fig. 1 is a front view, partly in section, of a heating device according to the invention, which is mounted upon an engine.

Fig. 2 is a section on the line II—II of Figure 1.

Fig. 3 is a detail view.

In the form of construction herein represented, 1 indicates one of the cylinders of an engine, and 2 the exhaust pipe of this cylinder. The said exhaust pipe 2 is provided with a branch pipe 3, whose flange 4 is secured to a pipe 5 whose end 6 enters the air intake conduit 7 of the carburetor 8 supplying fuel to the engine. On the end 6 of pipe 5 and in line therewith is mounted a tube 9 provided with internal and external heat-radiating ribs 10, which are provided solely on the part of the tube 9 situated within said air intake conduit 7. The tube 9 is open to the atmosphere at its outer end 11.

Between the flange 4 and the pipe 5 is provided a screen with a calibrated aperture 12 (Figs. 1 and 3) which is adapted to produce an expansion of the exhaust gas discharged from the cylinder 1, and hence to properly reduce the temperature of said exhaust gas. The heating temperature can also be regulated by means of a throttle valve 13 which is placed beyond screen 12 and is adapted to regulate the amount of exhaust gas circulating through tube 9.

The operation of the device is as follows: When the throttle valve 13 is opened, the exhaust gas from the cylinder 1 will flow through pipe 5 and tube 9; the major part of the heat of said gas is taken up by the ribs 10, and the internal ribs 10 will in turn heat the air flowing through the intake conduit of the carburetor. The heating of the air may be reduced or stopped by more or less closing the throttle valve 12.

Obviously, the invention is not limited to the form of construction herein described and represented, which is given solely by way of example.

Having now described my invention what I claim as new and desire to secure by Letters Patent is:

1. In an internal combustion engine, the combination of a carburetor, an air intake conduit for said carburetor, means for diverting a portion of the exhaust gas from said engine through said conduit for heating the air flowing therethrough and a screen with calibrated aperture in said latter means, ahead of said conduit for causing expansion of the exhaust gas past said screen.

2. In an internal combustion engine as claimed in claim 1, a throttle valve in said means, between said screen and said conduit.

In testimony whereof I have signed my name to this specification.

MARIUS JEAN-BAPTISTE BARBAROU.